United States Patent
Mukherjee

[11] Patent Number: 5,808,262
[45] Date of Patent: Sep. 15, 1998

[54] WIRE ELECTRODE FOR ELECTRO-DISCHARGE MACHINING AND METHOD OF MANUFACTURING SAME

[75] Inventor: Kalyan Kumar Mukherjee, Rishra, India

[73] Assignee: SWIL Limited, Calutta, India

[21] Appl. No.: 478,144

[22] Filed: Jun. 7, 1995

[51] Int. Cl.[6] .............................. B23H 1/06; B23H 7/08
[52] U.S. Cl. ...................................................... 219/69.12
[58] Field of Search ............................. 219/69.12, 69.15; 428/615, 618, 658, 674; 427/117, 123, 124; 148/518, 681; 205/305

[56] References Cited

U.S. PATENT DOCUMENTS

| | | |
|---|---|---|
| 4,287,404 | 9/1981 | Convers et al. . |
| 4,341,939 | 7/1982 | Briffod et al. . |
| 4,424,432 | 1/1984 | Kaneko et al. . |
| 4,631,237 | 12/1986 | Dommer et al. . |
| 4,673,790 | 6/1987 | Sawada et al. . |
| 4,717,804 | 1/1988 | Tomalin . |
| 4,740,666 | 4/1988 | Tomalin et al. . |
| 4,806,721 | 2/1989 | Ito et al. . |
| 4,839,487 | 6/1989 | Ito et al. . |
| 4,924,050 | 5/1990 | Hermanni ............................. 219/69.12 |
| 4,935,594 | 6/1990 | Groos et al. . |
| 4,952,768 | 8/1990 | Mohri et al. . |
| 4,968,867 | 11/1990 | Banzai et al. . |
| 4,977,303 | 12/1990 | Briffod . |
| 4,988,552 | 1/1991 | Tomalin . |
| 5,196,665 | 3/1993 | Briffod . |
| 5,206,480 | 4/1993 | Nakai et al. . |

FOREIGN PATENT DOCUMENTS

| | | |
|---|---|---|
| 312674 | 4/1989 | European Pat. Off. ............ 219/69.12 |
| 0 526 361 | 2/1993 | European Pat. Off. . |
| 293761 | 9/1991 | Germany .............................. 219/69.12 |
| 61-136733 | 6/1986 | Japan ................................... 219/69.12 |
| 05 337741 | 12/1993 | Japan . |

*Primary Examiner*—Geoffrey S. Evans
*Attorney, Agent, or Firm*—Jacobson, Price, Holman & Stern, PLLC

[57] ABSTRACT

A process of manufacturing spark erosion electrode particularly pertaining to electrode in wire form, for use in electrical discharge machining, the core of the electrode being of comparatively low zinc alpha brass with top layer of highly rich zinc beta and gama brass to facilitate better flashability of the electro-erosion process, and also to achieve comparatively higher tensile strength of the core material of the electrode, whereby relatively higher accurate vertical cut of the workpiece is possible, due to reduction of amplitude of high tension vibration of the core while cutting workpiece by electro discharge machining process (hereinafter referred to as EDM process).

22 Claims, 3 Drawing Sheets

WIRE ELECTRODE FOR ELECTRO-DISCHARGE MACHINING AND METHOD OF MANUFACTURING SAME

BACKGROUND OF THE INVENTION

Electro discharge machining process is a metal-removal process (also called electric-spark machining) in which materials that conduct electricity can be removed by an electric spark. The spark is a transient electric discharge through the space between the tool (cathode)-and the workpiece (anode). It is used to form holes of varied shape in materials of poor machinability which takes long time to complete with the help of conventional machine tool.

1. Field of the Invention

The present invention relates to a process of manufacturing spark erosion electrodes and more particularly to electrode in the wire form.

2. Prior Art Disclosure

When the EDM process was invented and subsequently commercial application started from mid-sixties, initial electrode material used was copper. Copper had its own drawbacks like low tensile strength and poor flashability. Both the reasons caused inaccurate cutting of the workpiece and low cutting speed. So copper was replaced by plain brass wire, whereby the conductivity of the core was sacrificed, but considerable strength thereof over copper, and comparatively better flashability over copper, was gained.

As ordinary brass was not in a position to provide the ideal requirements of an EDM electrode wire, various other materials have so far been adopted and used, some of which are mentioned herebelow, in brief.

U.S. Pat. No. 4,287,404 discloses an electrode for machining a workpiece by electrical discharges, the electrode having an active surface comprising at least 50% by weight of a metal or alloy selected from the group consisting of zinc, cadmium, tin, lead, antimony and bismuth. The mechanical strength of the wire and the intensity of the current flow through the wire has been proposed to be greatly increased by providing a wire having a steel core surrounded by a layer of copper or silver provided in turn by the protective thermal coating consisting of, for example, zinc, cadmium, tin, lead, antimony or bismuth, or alloys thereof.

U.S. Pat. No. 4,424,432 discloses an electrode material for travelling-wire type electrical discharge machining, said electrode material being drawn from a composition of 0.1 to 3% by weight zirconium, 0.3 to 10% zinc and the balance copper.

U.S. Pat. No. 4,631,237 discloses wire electrode for spark-eroding systems, said electrode having a core of a current-conducting material and a wire coating of a material with a lower evaporation temperature, for example zinc. The core consisting of one of the following alloys a) Cu Mg 0.4;
b) Cu Fe 2P;
c) Cu Cr Zr;
d) Cu Zr.

U.S. Pat. No. 4,717,804 discloses an electrical discharge machining electrode which comprises a composite member having an electrically conductive entirely metal wire length of ferrous alloy metal for its core and with said core being clad with a layer of copper whose outer surface is oxidized and coated with graphite.

U.S. Pat. No. 4,935,594 discloses a method for the manufacture of an eroding wire electrode for use in the spark-erosive cutting of electrically conductive materials, said electrode comprising a core of one of a metal and a metal alloy and at least one coating of one of a metal having a low volatilization temperature and an alloy of said last-mentioned metal, the improvement wherein for producing an altered coating, which can be cold-shaped only to a limited degree and is active during spark-erosive cutting, out of said first-mentioned coating, said wire electrode is annealed substantially at said low volatilization temperature until said altered coating is created, said altered coating including an alloy which extends from an outer surface of said wire electrode toward said core with a corresponding decreasing content of said metal having said low volatilization temperature, and wherein said wire electrode is subsequently cooled in a controlled manner to fix the diffusion states.

U.S. Pat. No. 4,968,867 discloses a wire electrode for wire cut electric discharge machining having a core wire of high thermal conductivity (made of copper, silver, aluminium or their alloys), an intermediate layer formed by a low-boiling point material(zinc), and an outermost layer of brass having high mechanical strength.

U.S. Pat. No. 4,977,303 discloses a method for forming an EDM wire electrode which comprises coating a copper wire core with zinc, and then heating the coated wire in an oxidizing atmosphere to simultaneously provide a copper-zinc alloy layer over the copper core and a zinc oxide surface on the alloy layer. The oxide and alloy-coated wire is then reduced in diameter to reduce the thickness of the alloy layer by about one-half of its initial thickness. The resulting electrodes wire permits a greater current density and a greater tractional force to be employed, yielding a significantly greater machining speed in the EDM process.

U.S. Pat. No. 5,196,665 discloses a method for manufacturing a multilayer electrode wire comprising the steps of:

superimposing a plurality of alternate fine layers of a first metal with high electrical conductivity and a second metal with a low melting and vaporization point onto a core made of electrically conductive material;

finishing said superimposed alternate fine layers with a said layer of said-second metal; and cold drawing said superimposed fine layers and said finishing layer to cold-form said electrode wire without causing any of said metals to diffuse into an adjacent said layer.

U.S. Pat. No. 4,341,939 discloses a metallic wire, for cutting a workpiece by electrical discharge machining, coated with at least one layer of a metal having a low temperature of vaporization and film of a metal oxide on the metal layer. The metallic coating is preferably made of zinc and is subjected to an oxidizing thermal or electrolytic treatment such as to form on the surface of the metallic layer a thin film of zinc oxide.

U.S. Pat. No. 4,952,768 discloses an electrode for precision electric discharge machining is formed by silicon or other materials, a base of a low melting point metal or an alloy of such a low melting point metal is covered with a layer composed of a mixture of the metal land a high resistivity inorganic compound.

U.S. Pat. No. 5,206,480 discloses a wire electrode for electro-discharge machining made of a Cu alloy containing 38 to 50 percent by weight of Zn. Cu alloy may also contain 0.01 to 1.0 percent by weight of Zr, 0.001 to 0.05 percent by weight in total of at least one element selected from a group of Ce, Ti, Mg, Bi and Mn, and/or 0.01 to 2.0 percent by weight of at least one element selected from a group of Al, Si, Fe, Ca and La. A method of manufacturing a wire electrode comprising the steps of preparing a Cu alloy material containing 38 to 50 percent by weight of Zn and thinning the Cu alloy material employing roll working and/or warm working at least in a part of working process.

U.S. Pat. No. 4,673,790 discloses a wire electrode for use in electro-discharge machining formed essentially of Cu, including Zn of 54 through 38% by weight and Si of 0.1 through 0.5% by weight so as to suppress sputtering of the electrode material to the workpiece and to improve workability The wire electrode may include Zn of 30 through 40% by weight, Si of 0.1 through 1.2% by weight and Al of 0.01 through 0.2% by weight in addition to Cu.

U.S. Pat. No. 4,806,271 discloses production of base-type conductive polymers, particularly from the family of conductive polyaniline, by reacting a base-type non-conductive polymer containing carbon-nitrogen linkages, e.g. polyaniline, with a cation donor compound, such as R SO R'SO Cl or R" SiCl, where R, R' and R" are alkyl or aryl, such as dimethyl sulfate or tosyl chloride, and forming an electrically conductive polymer in which the R groups of R SO, the R'SO groups of R'SO Cl, or the R" Si groups of R" SiCl are covalently linked to the nitrogen atoms of the polymer.

U.S. Pat. No. 4,740,666 discloses an improved electrical discharge machining electrode permitting improved cutting action to be achieved at the same level of electrical power being applied to the wire electrode.

U.S. Pat. No. 4,988,552 discloses a wire electrode for a traveling wire EDM apparatus that comprises a copper clad steel core that is clad with a homogenous, outer brass layer using a classical bonding process. The copper clad steel core has a conductivity in the range of 50%–70% IACS (International Annealed Copper Standard) and the brass layer comprises 35%–50% by volume of the electrode. The brass layer comprises 65% copper and 35% zinc in an optimum construction.

The spark erosion electrode for "EDM" process, and the technology for the production thereof, as invented and developed by the inventor is cheaper, totally novel and facilitates faster cutting of workpiece.

The processes and the products according to the aforesaid prior art are relatively expensive.

SUMMARY OF THE INVENTION

The object of the present invention is to provide a comparatively less expensive process for manufacturing wire electrode for use in EDM process, which affords comparatively better physical and chemical characteristics of the wire to facilitate better EDM erosion for accurate cutting of workpiece.

It is known that tensile strength of Brass increases with the increase of Zinc content. It rises very rapidly with the appearance of Beta-Phase. At 32% zinc content the tensile strength of brass becomes maximum when alpha and Beta phases are present in approximately equal proportion.

Keeping the above aspect in view, the present invention contemplates to produce spark erosion electrode, the core whereof is of comparatively low zinc alpha brass with top layer of highly rich zinc beta and gama brass to facilitate better flashability of the electro-erosion process, and also to achieve comparatively higher tensile strength of the core material of the electrode.

In use of the spark erosion electrode, so produced, in "EDM" process, the following material removal rate, compared to what is achieved from normal brass electrode, has been noticed

| Material | Machine Type | Normal Brass MM/Min. | Present Invention Wire MM/Min. | % increase |
|---|---|---|---|---|
| Hardened Steel | ELECTRONICS | 16.4 | 18.8 | 14.6% |
| Aluminium | ELECTRONICS | 13.0 | 18.0 | 38.5% |
| Hardened Stl. | MAKINO | 36.0 | 50.4 | 40% |
| Hardened Stl. | SODIK | 77.0 | 101.2 | 31.4% |
| Hardened Stl. | AGIE 200-D | 78.0 | 105.0 | 34.6% |

DETAILED DESCRIPTION OF THE INVENTION

Accordingly, the present invention provides a process of manufacturing spark erosion electrode, which comprises plating with zinc, by galvanising, a core wire made of brass, and of diameter more than the desired diameter of the final wire; putting coil(s) of the zinc plated wire in a bath pot; heating the pot in double vacuum furnace at a temperature below the melting temperature of zinc for a prolonged period of more than 24 hours, the temperature of the furnace being increased gradually from a starting temperature of 60°–70° C., with the final temperature, depending on the required thickness of zinc to be absorbed within the brass, and the diameter of the wire, being held for 10 to 20 hours, gradually cooling the pot upto the ambient temperature over a prolonged period of about 24 hours; drawing the wire to reduce its diameter to an intermediate stage almost upto the desired final diameter thereof; subjecting coil(s) of the wire to gradual heating in double vacuum atmosphere for prolonged period, as done earlier, and carrying out final drawing of the wire upto its desired diameter, optionally, followed by resistance annealing thereof, in the manner such as herein described.

Preferably, the core wire is produced from a square wire, spirally cut from a disc/plate made of the starting composition of brass, by centrifugal casting, said square wire being gradually shaped to the said core wire of desired diameter, by drawing, followed by annealing and pickling, as required.

In a particular embodiment, centrifugal casting is done with a composition of 61.5% copper and 38.5% zinc with plus minus 0.2%. To get precise composition both outer portion as well as the central portion of the disc are discarded. At high speed centrifugal process, heavier particles go to the top portion of the plate and the lighter particles come at the central portion. The middle portion is more or less of uniform composition.

However, the above composition of the wire is extremely difficult to draw and frequent inter annealing is required to get a diameter of around 3.00 mm.

The prolonged heating of the coil(s) of wire, below the zinc melting temperature (i.e. 419° C.) results into:

(i) absorption of zinc inside the brass to a great extent forming highly enriched zinc composition brass known as Kirkendal effect, and (ii) to get a granular structure which provides better conductivity as well as better splashability due to lower vapor pressure.

PREFERRED EMBODIMENT

In a preferred embodiment, the square wire is drawn through round dies to obtain round wire, the latter being welded together, if necessary, to get a big coil thereof followed by mechanical polishing of the same, with the help of grooved grinding wheel. As stated earlier, the outer and central portion of the disc/plate are discarded, while making the square wire from the disc/plate, by spiral cutting, with a view to get uniform composition of brass.

Preferably, prior to plating with zinc, the coil(s) of wire is(are) annealed and then pickled.

The coil(s) of wire is(are) subjected to double vacuum atmosphere by creating vacuum in the bath pot and also in the furnace. Preferably, the vacuum is created in the bath pot and in the furnace by usual sucking followed by introduction of nitrogen, and pumping out the same, and repeating the said procedure, if necessary, with a view to make the inside of the bath pot and that of the furnace totally free from oxygen.

The coil(s) of wire, duly cooled inside the pot by gradual cooling of the latter for a prolonged period, is(are) pickled e.g. by sulphuric acid, prior to further drawing thereof.

The resistance annealing of this finally drawn wire may be done by resistance heating arrangement, provided in-built with the drawing machine, as known in the art, where high current of electromotive force is caused to be passed through the wire at low voltage so as to heat the wire almost immediately due to the resistance of the wire.

In a particular embodiment, the centrifugal casting is done at 600 RPM to get a disc/plate of 600 mm outer diameter and thickness of 16 mm. Preferably, the cast disc/plate surface is subjected to grinding/scalping for surface cleaning thereof. Prior to spiral cutting, rolling of the plate/disc is done to reduce the thickness thereof upto 6.5 mm. Thereafter, square wire of 6.5 mm×6.5 mm is made from the disc/plate by spiral cutting. Then, the square wire is drawn through round dies to obtain round wire of 5.60 mm diameter. In the next stage, the diameter of the wire is reduced to 3.0 mm by drawing, preceded by inline annealing and pickling, and said wire is plated with zinc by galvanising. Preferably, the inline annealing of the wire is done in double vacuum furnace at 620° C. for a period of 5 hours. The pickling of wire may be done with sulphuric acid. Preferably, 10 to 40 microns of zinc is provided on the surface of the wire by zinc plating. Thereafter, the coil(s) of wire drawn upto 3.0 mm diameter and kept inside the bath pot, is(are) gradually heated in the furnace, both the said pot and the furnace being kept under vacuum and in total absence of oxygen, as aforesaid, the temperature of the furnace being gradually raised upto 370° C. to 395°C. and the duration of the heating at the said temperature is maintained for 24–26 hours. After creation of the vacuum in the pot and in the furnace, the temperature is gradually increased from 60°–70°C. in steps of 50°C. at an interval of 2 hours upto 300°C., and then at 25°C. upto 350°C., and at 10°C. upto 380°C., and thereafter at 5°C. at the intervals of half an hour, and holding the final temperature, so raised, for a period of 18 to 20 hours. The coil(s) of wire, as obtained finally, is(are) spooled.

In the process according to this invention highest possible overall zinc content can be achieved but at the same time it can be drawn to fine sizes with maximum reduction of upto 96% area reduction without inter annealing. This gives huge process cost reduction and finally the wire is stress released at a temperature of about 37°C. and ultimately a tensile strength of more than 95 kgs/cm can be achieved. This tensile strength will be most ideal for modern auto feed machines and also for high tension cutting to set most accurate vertical cut.

It would be appreciated that in the hither-to-known process/systems the wire stays inside the pipe type furnace around 8 to 10 seconds. This is equivalent to treatment of about 40 mm wire per minute. For a standard size of 0.25 mm wire at a speed of 40 mm per minute, a production of 24 kg/24 hours may be expected. For a standard furnace of 31 pipe at 75% efficiency approximately 540 kgs of production is expected against the production of 1000 kgs per 24 hours according to the process of this invention. So, the production rate is about double in the type of production according to this invention.

Again, in the case of Pipe type furnace production, the cost is higher because of continuous supply of reducing atmosphere i.e. combination of Nitrogen and Hydrogen, whereas in the process of this invention, this is not required.

The invention will be illustrated hereinafter with reference to the following example: A disc was made, by centrifugal casting, from molten brass having composition of 61.5. copper and 38.5% zinc ±0.2%.

The centrifugal casting was done at a speed of 600 RPM with cast disc of outer diameter 600 mm and thickness of 16 mm. The disc was properly scalped and rolled to reduce the thickness thereof upto 6.5 mm, and to increase the diameter of the same.

Spiral cutting of the disc was done to get rod coil, and a square wire of 6.5 mm×6.5 mm was cut. Prior to spiral cutting, the outer and the central portions of the disc were discarded to get uniform composition, remaining at the middle portion thereof.

The square wire was then passed through round die and ultimately at 5.60 mm diameter round shaped wires in coil form, of 100 kgs weight each were obtained. Then these coils were annealed in double vacuum furnace at 620° C. for a period of 5 hours, and then pickled with sulphuric acid. The wires were welded to make the coils.

Thereafter the wires, in coil form, were drawn to 3.00 m dia, followed by annealing and pickling thereof. The wires, so treated, were then plated with zinc by age-old galvanic process and then put under the furnace of double vacuum. For such purpose, the coils of brass wire, coated with zinc were kept inside a bath pot, and the pot was inserted in a furnace. The bath pot as well as the furnace were processed to create double vacuum. The vacuum was created in the bath pot and in the furnace by usual sucking followed by introduction of nitrogen, and pumping out the same, and repeating the said procedure, if necessary, with a view to make the inside of the bath pot and that of the furnace totally free from oxygen.

After the vacuum was created the temperature was gradually increased in steps of 50° C. at an interval of two hours upto 300° C. then 25° C. upto 35° C., and 10° C. upto 380° C. and thereafter 5° C. at the interval of half an hour. The time of holding the final temperature was 18 to 20 hours, and the total time of keeping the coils inside the furnace was between 24 to 26 hours.

The pot was then taken to cooling vat and cooled very gradually upto room temperature for about 24 hours.

Then the coils of wire were taken out from the annealing pot and were subjected to both inline mechanical polishing of the wire surface by means of grooved grinder wheel as well as for chemical surface cleaning as preparatory steps for the lubricant carrier facility of the wire to help maximum possible drawing of the coils of wire in a single shape at a reduction of more than 94.3% in area to get the diameter of the wire upto an intermediate shape between 1 to 1.25 mm.

Then the wires were again charged inside the double vacuum furnace and same procedure of prolonged heating was done. With this second prolonged heating of the wires, top layer zinc further penetrated towards the core and there was a gradually higher zinc content towards the surface of the wire.

The purpose of the gradual change of zinc content was to provide better splashibility of the EDM wire so that it would perform far better than the conventional EDM wire.

Thereafter, final drawing of the wire upto 0.15 to 0.30 mm was done in a wet type drawing machine and in the same mechanical composition these were put to resistance annealing. This was done by resistance heating arrangement, provided in-built with the drawing machine, as known in the art, where high current of electromotive force was caused to be passed through the wire at low voltage so as to heat the wire almost immediately due to the resistance of the wire. The said resistance annealing was done to release the in built stress and to get the desired straightness of the finished wire, and the wire was heated when the wire was in tension.

Finally the wire was spooled and said spools were put in a chamber, wherein water was sprayed to form steam with a view to protect the wire surface.

It is to be understood that various modifications of the process according to this invention are possible within the scope of what has been described hereinbefore and will be claimed hereinafter.

BRIEF DESCRIPTION OF THE DRAWINGS

Various changes which occur in the composition and metallurgical structures of the electrode wire, during its production, following the process according to this invention, are illustrated by way of photomicrographs of the sections of the wire, at different stages, as shown in the accompanying drawings, wherein.

Figure 1:
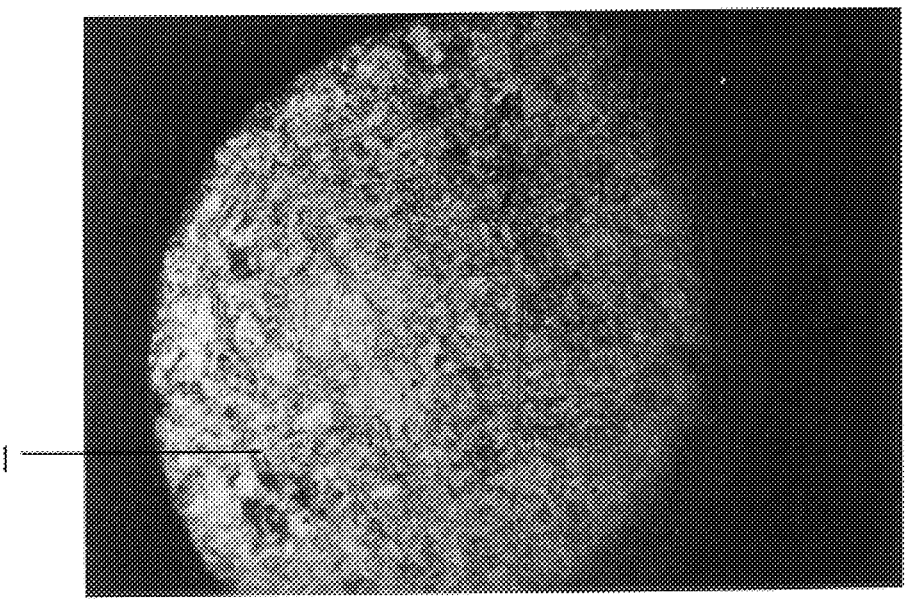
FIG. 1: shows, in section, one embodiment of a core wire made of brass (indicated by 1) in annealed condition, but prior to plating with zinc by galvanizing.
Figure 2:
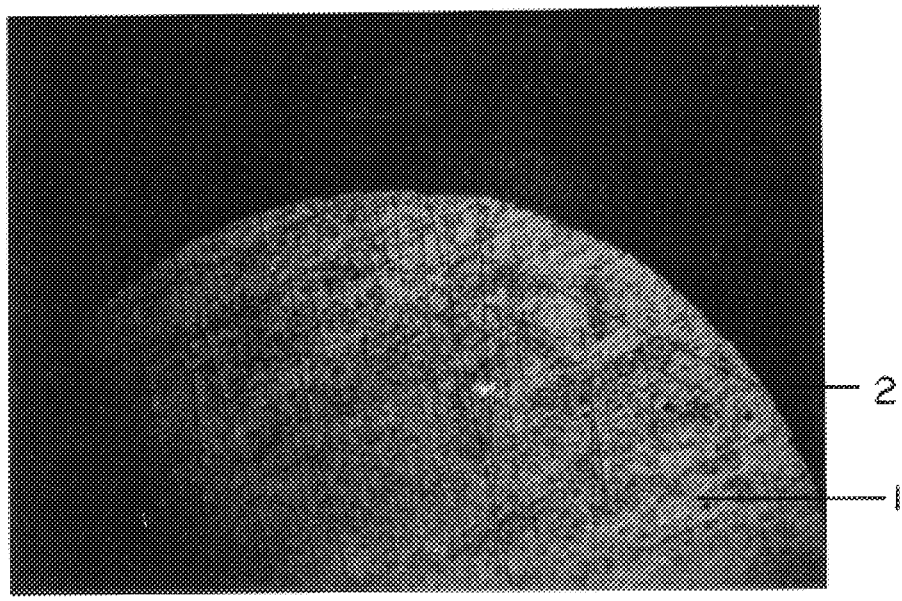
FIG. 2: shows, in section, the same core wire, as shown in FIG. 1, which has been plated with zinc, where the α-brass core is indicated by 1, and the zinc-coating therearound is indicated by 2.
Figure 3:
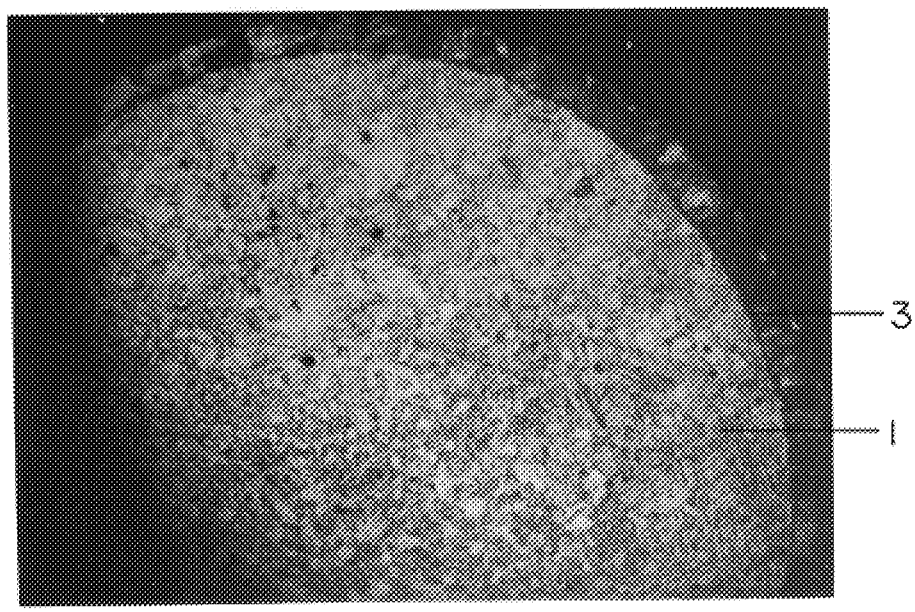
FIG. 3: shows, in section, the same wire, as shown in FIG. 2, which has been heated in vacuum at temperature below the melting temperature of zinc for 24 to 26 hours, with the result, due to Kirkendal effect, that the core remains α-brass, as indicated by 1, while the zinc coating (indicated by 2 in FIG. 2)—transforms to β-and α-brass, (as indicated by 3.
Figure 4:
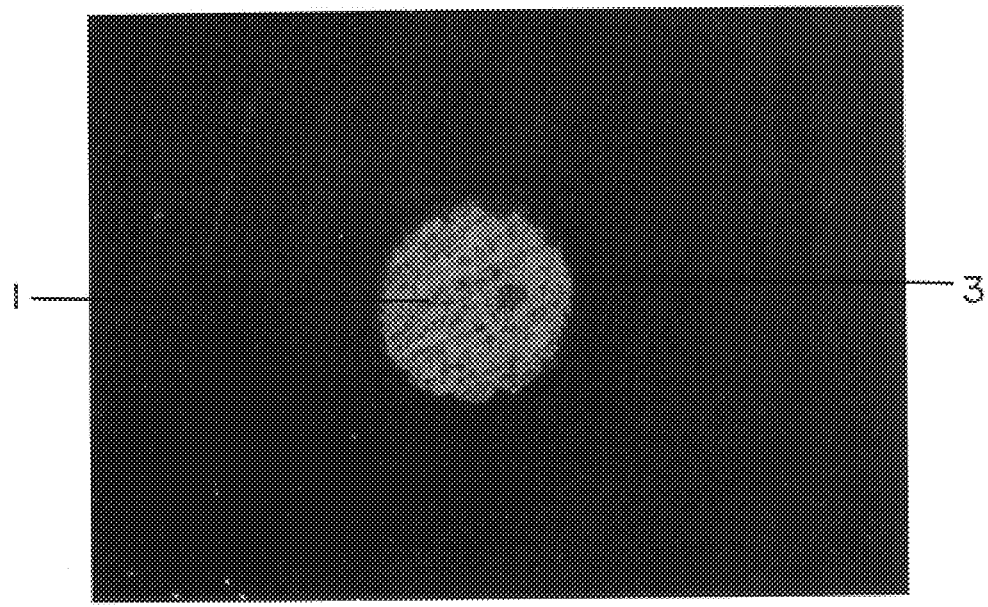
FIG. 4: shows, in section, the finally drawn wire from the treated wire, shown in FIG. 3, after reduction in cross sectional area of about 95%, where the core remains α-brass, as indicated by 1, and the surrounding layer is β-and γ-brass, as indicated by 3.
Figure 5:
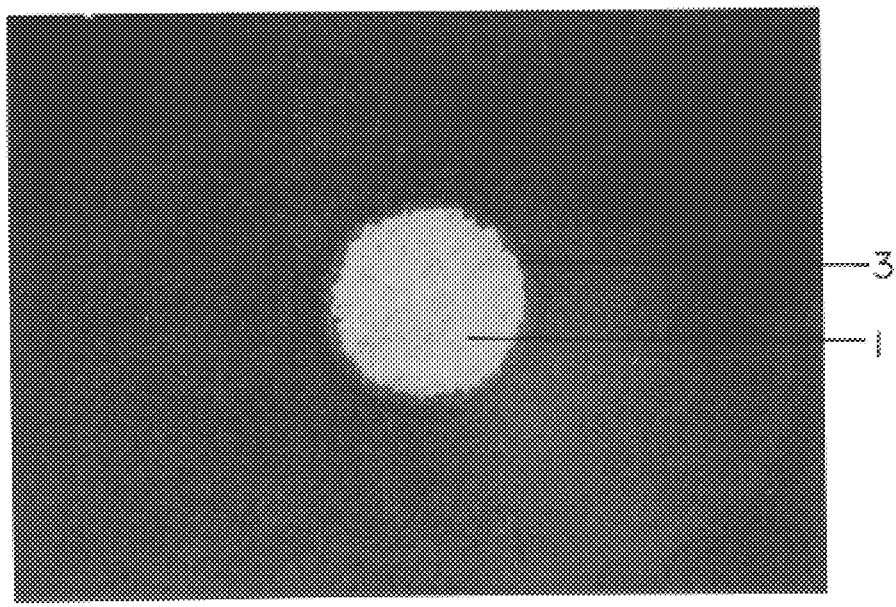
FIG. 5: shows, in, section the same embodiment of the finally drawn wire, as shown in FIG. 4, which has been stress-released after final resistance annealing, as described hereinbefore. As seen, the composition and structure of the core 1 and the outer layer 3 remains unchanged.

I claim :

1. A process of manufacturing a spark erosion electrode, said process comprising
   (a) plating with zinc, by galvanising, a core wire made of brass, and of a diameter more than the desired diameter of the final wire;
   (b) putting coil(s) of the zinc plated wire in a bath pot; and heating the pot in a furnace with double vacuum atmosphere being maintained by creating a vacuum in the bath pot and also in the furnace, to avoid oxidation on the surface of the wire, said heating being commenced at a starting temperature of 60° to 70° C. and raising the temperature gradually to a final temperature between 350° C. to 370° C. through a prolonged period of more than 24 hours, the temperature of the furnace being increased gradually from said starting temperature to said final temperature of the bath depending on (i) the required thickness of zinc to be absorbed within the brass of the core wire, and (ii) the diameter of the core wire, said final temperature being maintained for 18 to 20 hours,
   (c) gradually cooling the bath pot up to the ambient temperature through a prolonged period of about 24 hours;
   (d) pickling the coil(s) of wire, so heated and cooled, to remove slight coating of nitride, formed out of non-oxidizing atmosphere during said heating/cooling;
   (e) drawing the wire to reduce its diameter to an intermediate stage almost up to the desired final diameter thereof;
   (f) gradually heating the so cooled coil(s) of the wire in double vacuum atmosphere through a prolonged period of over 24 hours, as in step (b), and
   (g) finally drawing the wire up to its desired diameter, followed by resistance annealing of said wire, by a resistance heating arrangement, where high current of electromotive force is caused to be passed through the wire at low voltage so as to heat the wire substantially immediately due to the resistance of the wire.

2. The process as claimed in claim 1, wherein the core wire is produced from a square wire, spirally cut from a brass disc or plate made of the starting composition of brass, by centrifugal casting, said square wire being gradually shaped to the core wire of desired diameter, by drawing, followed by annealing and pickling.

3. The process as claimed in claim 2, wherein the square wire is drawn through round dies to obtain round wire, the round wire being welded to get a coil thereof followed by mechanical polishing of the round wire.

4. The process as claimed in claim 2, wherein the outer and central portion of the disc or plate are discarded, while making the square wire from the disc or plate by spiral cutting.

5. The process as claimed in claim 2, wherein the disc or plate, made by centrifugal casting, is from molten brass having a composition of 61.5% copper and 38.5% zinc ±0.2%.

6. The process as claimed in 2, wherein the disc or plate, made by centrifugal casting, is from molten brass having a composition of 95% copper and 5% zinc ±0.5%.

7. The process as claimed in claim 6, wherein the centrifugal casting is done at 600 RPM to get a disc or plate of 600 mm outer diameter and thickness of 16 mm.

8. The process as claimed in claim 7, wherein the cast disc or plate surface is subjected to grinding or scalping for surface cleaning thereof.

9. The process as claimed in claim 8, wherein the plate or disc is rolled to reduce the thickness thereof up to 6.5 mm.

10. The process as claimed in claim 9, wherein square wire of 6.5 mm×6.5 mm is made from the disc or plate by spiral cutting.

11. A process as claimed in claim 10, wherein the square wire is drawn through round dies to obtain round wire of 5.60 mm diameter.

12. The process as claimed in claim 11, wherein the diameter of the wire is reduced to 3.0 mm by drawing, preceded by inline annealing and pickling, and said wire is plated with zinc by galvanising.

13. A process as claimed in claim 12, wherein the annealing of the wire is done in double vacuum furnace at 620° C. for a period of 5 hours.

14. The process as claimed in claim 12, wherein the pickling of wire is done with sulphuric acid.

15. The process as claimed in claim 12, wherein 10 to 40 microns of zinc is provided on the surface of the wire by zinc plating, depending upon the end use.

16. The process as claimed in claim 15, wherein the coil(s) of wire drawn up to 3.0 mm diameter and kept inside the bath pot, is (are) gradually heated in the furnace, both the port and the furnace being kept under vacuum and in total absence of oxygen, the temperature of the furnace being gradually raised up to 350° C. to 370° C. and the duration of the heating at the temperature is maintained for 24–26 hours.

17. The process as claimed in claim 16, wherein after creation of the vacuum in the pot and in the furnace, the temperature is gradually increased from 60°–70° C. in steps of 50° C. at an interval of 2 hours up to 300° C., and then at 20° C. up to 34° C., and at 5° C. up to between 340° and 370° C. at an interval of half an hour, and holding the final temperature, so raised, between 350° and 370° C. for a period of 18 to 20 hours.

18. The process as claimed in claim 1, wherein the vacuum is created in the bath pot and in the furnace by sucking followed by introduction of nitrogen, and pumping out the nitrogen, and repeating the procedure of introduction and pumping out of nitrogen, whereby the inside of the bath pot and that of the furnace are kept totally free from oxygen.

19. The process as claimed in claim 1, wherein the coil(s) of wire, duly cooled inside the pot in step (c) by gradual cooling of the latter, is (are) pickled in step (d) by sulphuric acid, prior to further drawing the wire.

20. The process as claimed in claim 8, wherein the coil(s) of wire is (are) subjected to mechanical polishing and chemical surface cleaning, prior to pickling the wire.

21. The process as claimed in claim 1 wherein the coil(s) of wire, as obtained finally, is(are) spooled.

22. The spark erosion electrode, in wire form, for use in electrical discharge machining produced by the process claimed in claim 1.

* * * * *